(No Model.) 2 Sheets—Sheet 1.
J. B. LINN.
BALL TRACTION AND TREAD FOR VEHICLES.
No. 534,442. Patented Feb. 19, 1895.
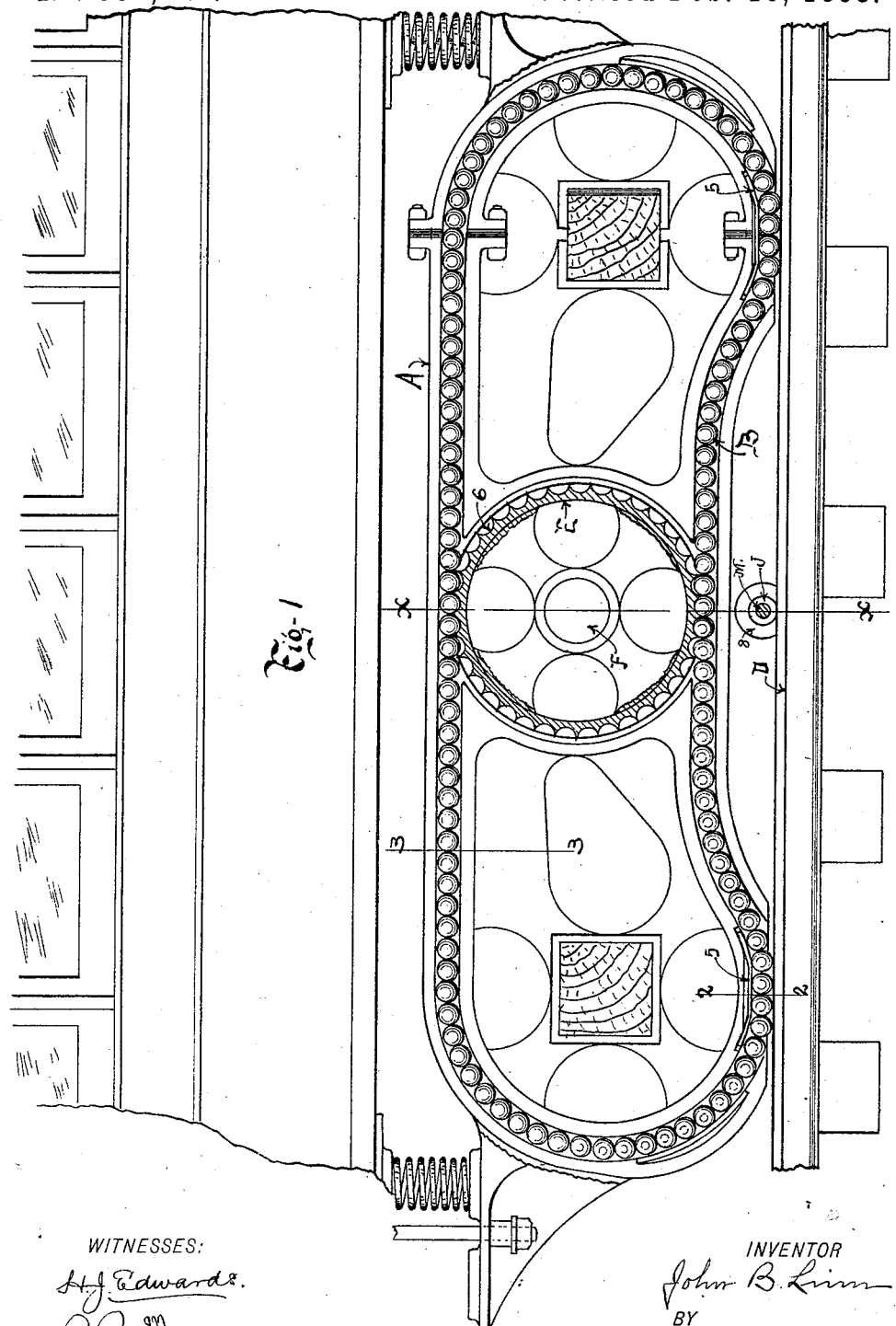
WITNESSES:
H. J. Edwards.
R. B. Moser
INVENTOR
John B. Linn
BY
H. J. Fisher
ATTORNEY.

(No Model.) 2 Sheets—Sheet 2.
J. B. LINN.
BALL TRACTION AND TREAD FOR VEHICLES.
No. 534,442. Patented Feb. 19, 1895.
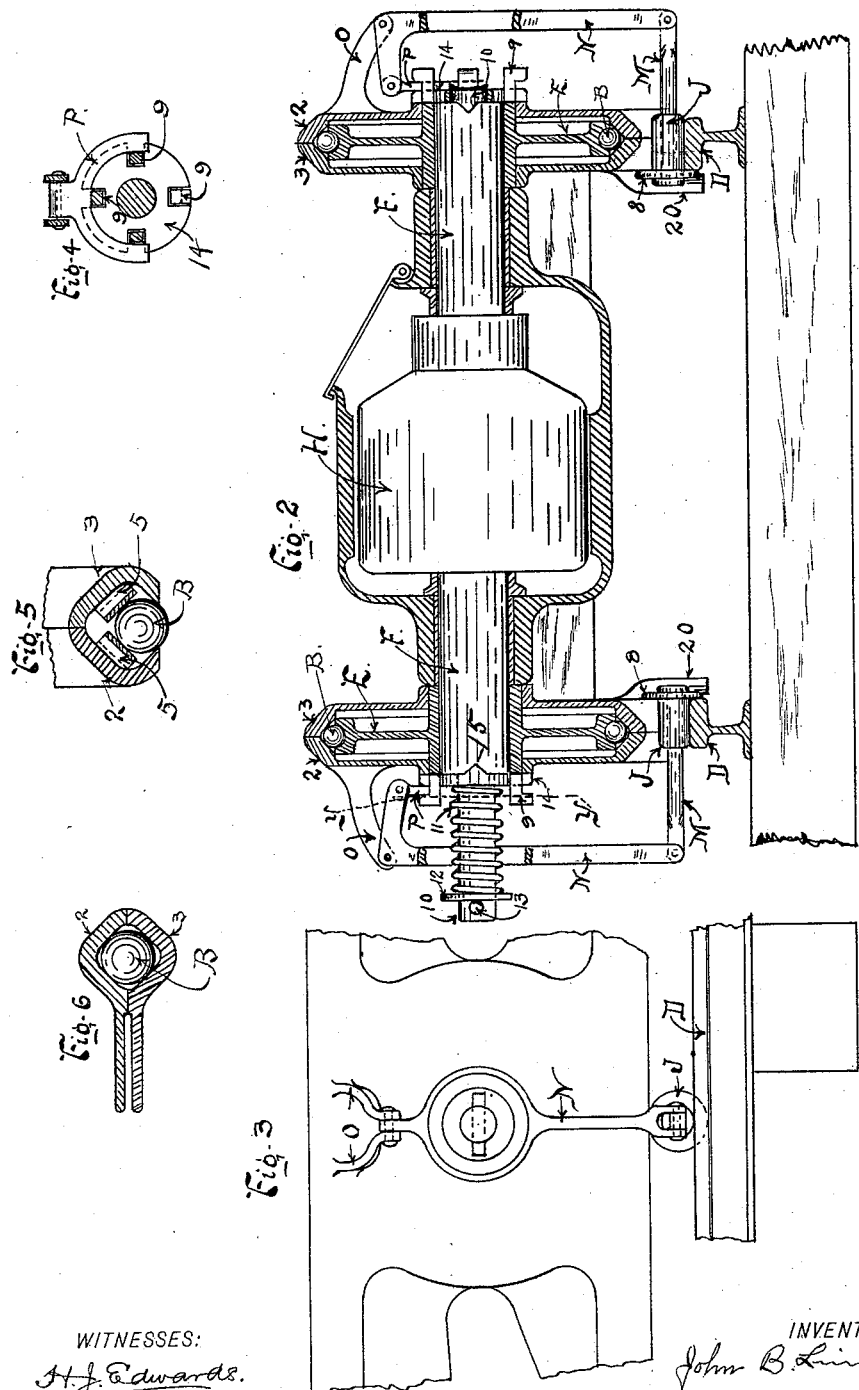
WITNESSES:
H. J. Edwards.
R. B. Moser.
INVENTOR
John B. Linn
BY
H. J. Fisher
ATTORNEY.

UNITED STATES PATENT OFFICE.

JOHN B. LINN, OF CLEVELAND, ASSIGNOR OF ONE-HALF TO O. S. KELLY, OF SPRINGFIELD, OHIO.

BALL TRACTION AND TREAD FOR VEHICLES.

SPECIFICATION forming part of Letters Patent No. 534,442, dated February 19, 1895.

Application filed July 9, 1894. Serial No. 517,038. (No model.)

*To all whom it may concern:*

Be it known that I, JOHN B. LINN, a citizen of the United States, residing at Cleveland, in the county of Cuyahoga and State of Ohio, have invented certain new and useful Improvements in Ball Tractions and Treads for Vehicles; and I do hereby declare that the following is a full, clear, and exact description of the invention, which will enable others skilled in the art to which it appertains to make and use the same.

My invention relates to ball tractions and treads for vehicles, and the invention consists in a vehicle in which the usual wheels for supporting and conveying the vehicle are dispensed with and a series of balls or spheres is arranged to transmit the power and to take the tread of the vehicle, and combined therewith is certain driving mechanism for actuating the spheres and impelling the vehicle on its way while the spheres travel upon a track or road-way provided for that purpose, all substantially as shown and described and particularly pointed out in the claims.

In the accompanying drawings, Figure 1 is a vertical sectional elevation of my improved power transmitting and tread mechanism and of a portion of a car supported thereon, as hereinafter more fully described. Fig. 2 is a cross-section of the said mechanism on a line corresponding to $x, x$, Fig. 1. Fig. 3 is a side elevation of part of the mechanism for relieving friction in turning curves in the track corresponding to a view looking in from the left or the right of Fig. 2. Fig. 4 is a detail looking in from about the line $y, y$, Fig. 2, and revealing part of the mechanism for relieving friction associated with the part shown in Fig. 3, and also as hereinafter more fully described. Fig. 5 is a cross section on a line corresponding to 2, 2, Fig. 1, and Fig. 6 is a cross section corresponding to line 3, 3, Fig. 1.

As already indicated, this invention embodies the feature of ball tread for vehicles, which is fully described and claimed in my application for Letters Patent bearing Serial No. 515,221, but in addition to this I also employ the balls for power and traction purposes, and have so arranged the balls and applied the power through them that the balls sustain the character to one another substantially of a continuous connection like a chain or cable or other unbroken connection.

In Fig. 1 I have shown an interior elevation of the casing and chain of balls therein upon one side of the car or vehicle, and this mechanism is duplicated on the opposite side so that a description of this view will suffice for both. The said casing A is composed of two sections —2— and —3—, constructed to be bolted firmly together face to face and having the conformation required to adapt it to traction and power purposes. Of course each section or side of the casing may be formed in one or more pieces, but these pieces when united will serve the same purpose as if each side were made in a single piece. Said sides or sections —2— and —3— have substantially semi-circular grooves or channels in their faces opposite one another and forming together a continuous or endless channel or path for the balls B and in which the balls are confined for co-operation in all the service of propelling and conveying the car.

It will be seen that the said casing A is narrowed at its center and deepened relatively to the center at its ends. This serves to bring only that part of the casing and the ball channel down to the car track that has to do immediately with the matter of tread or carrying of the car, while the narrowing of the middle part raises the same from the track or road bed and also brings the balls above and below in said channel into more practical relation to be acted upon by the power. The balls B necessarily are in continuous touch through their entire circuit because they serve to communicate the power by which the car is impelled, and they come in turn to the four points on which the weight of the car is sustained and where they take the place of the usual wheels in bearing the car along. At these bearing or carrying points in the channel the outer path of the casing is constructed to form an opening to admit about four of the balls to come through and travel about four at a time on the track D. In appearance the casing looks as if it were cut away on a straight line parallel to the rail D at such an elevation as to expose about one-third of the ball beneath the line thereof. Above this line and point of ball bearing, traction and tread on the rail and along the upper part of the ball bearing in the channel therefor, I arrange a spring —5— set into the casing in such way and having itself such quality and character as to afford a slightly yielding bearing for the balls as they come successively to the place where they have to sustain and take the impact of the load. Said spring or part —5— is straight midway of its length so as to take the bearing of about four balls side by side, and the balls that carry the load have this top part —5— as their upper bearing while they are in the load carrying and conveying position. The ends of said part or piece —5— are deflected to the curvature of the path or channel of the balls. All the tread or carrying spaces are alike equipped with said spring part —5—.

Having the casing and the balls constructed and arranged as shown and described, I am enabled to utilize the balls for the transmission of power in propelling the car and for the purposes of traction by introducing a wheel E to communicate or apply the power from the power shaft F so that its periphery shall engage the balls. In the present construction the casing is so formed and the balls so arranged therein that the wheel E engages in both the top and the bottom ball channels, thus engaging the balls at two places in their endless path.

Of course a single engagement might serve my purpose, but where the channel is of the length relatively of the one here shown and traction and tread occur at two places in each channel on the side of the car there is manifest advantage of having a double engagement with the balls.

It will be seen that the wheel E is constructed with a series of depressions or cavities —6— in its periphery corresponding to the outline and size of the balls, the said cavities being substantially semi-spherical, and along the top of the channel the balls drop into these cavities as they are crowded along in turn, and the projections at the sides of the cavities and separating them serve to engage and carry the balls forward. At the bottom the cavities ride over the balls and though the wheel E is in a reverse position here to what it is at the top of the ball channel it still has exactly the same effect upon the balls in impelling them forward by force. The balls leave the cavities in each case and pass on in the chain or connection as they are pressed forward by others behind them. There is one wheel E used upon each side of the car and both wheels are fixed alike upon the shaft F.

I have shown in Fig. 2 an electric motor H as the means of power to propel the car, but I may use any other engine or means of power for rotating the shaft F and doing the work.

In turning curves in a road it is desirable that friction should be avoided as much as possible, and so I have constructed the motor and wheels E with clutch connections adapted under certain circumstances to disengage the wheel from the shaft of the motor at one side or the other, according as the wheel is on the shorter or the longer radius of the curve. Assuming that we have either wheel upon the longer or outer radius of the curve, it is well known that there is a tendency for the car to travel in a direct line. As this occurs I have provided means to temporarily release the outer wheel E from the shaft F and throw the action upon the other wheel until the curve has been passed and a direct line is assumed. To this end I have placed a flanged roller J in position to rest upon the track or rail D and provided with a flange —8— on its inside to engage the inner edge of the said rail. A rod or spindle M passes through this roller and is connected at its outer end with a lever arm N and is pivoted at its top on projection O. Said lever arm is fashioned with a bell crank extremity at its top to which is secured he yoke P. This yoke is adapted to engage the L shaped projection —9— at top, bottom and sides. These projections are upon the edge of the hub of the wheel E and of course turn therewith. Upon the shaft F at each end is a narrow spindle —10— with a spiral spring —11— encircling the same and bearing against a collar —12— locked in position by a pin —13—. Said spring in turn bears against the notched disk —14— which has a transverse V shaped rib —15— on its inside and is sleeved over the spindle —10— and has notches in its edges adapted to slide on the projections —9—. When the car is taking the curve the tendency will be to pull the lever arm N inward at its lower end and thus lift the yoke P and disengage it from the projections —9—. When this occurs the disk —14— is released so that the axle F which extends entirely across the car may be turned and not turn said wheel, the beveled rib —15— riding upon the end of the shaft and keeping out of engagement. The spring —11— of course presses the disk —14— inward constantly but not sufficiently to make a locking engagement between the wheel and the shaft. Such engagement for operation occurs only when the yoke P is again dropped back into the L shaped lugs —9—, which holds the disk —14— in its notch in the shaft and causes the parts E and F and the said disk to rotate together.

Referring to Fig. 1, it will be seen that the casing A is made in two sections vertically, and that the sectional line comes on the straight portions above and below of the ball channel. As the balls wear away by friction the casing may be compacted by removing the spacing plates or packing which is set in at the point where the sections of the casing meet. Usually sheet metal plates or strips will be laid into this space and one or more of these strips are in at a time to take up any wear in the balls.

What I claim is—

1. In the propulsion of a vehicle, a casing having a channel for balls and constructed to expose said balls at one or more places to form a bearing for traction, and a power pinion engaging the balls, substantially as set forth.

2. The construction described consisting of the casing having a continuous ball channel and constructed to expose said balls at two places to form a traction bearing for a vehicle, and a rack pinion for said balls located between said bearing points, substantially as set forth.

3. In the propulsion of a vehicle upon a plain surface, a continuous channel filled with balls so arranged as to bear at one or more points upon said plain surface, thereby forming a continuous rack between such bearing point and a cup toothed pinion driven by a motor attached to said vehicle, substantially as set forth.

4. A truck formed of two ball bearing casings and each of said casings having a continuous channel constructed at its bottom to expose balls to form a bearing for traction, balls in said channels, and a toothed pinion for each of said channels, substantially as set forth.

5. A truck for vehicles having a series of balls at each side confined in a channel in the ball casings, said balls having a tread upon a plain surface at one or more points in their path and suitable springs secured over the tread of said balls and within said channel, substantially as set forth.

6. The means herein described consisting of the motor shaft, the power wheel for driving the balls and the clutch mechanism constructed to disengage said wheel from said shaft when the wheel is on the outer radius of the track, substantially as set forth.

7. The ball channeled casing constructed with a plurality of openings on the same plane to expose the balls for traction purposes and having the ball channel between said openings curved upwardly to raise the channel intermediately above the plane of said openings, substantially as set forth.

Witness my hand to the foregoing specification.

JOHN B. LINN.

Witnesses:
   H. T. FISHER,
   GEORGIA SCHAEFFER.